(12) United States Patent
Hirayama (10) Patent No.: US 9,888,148 B2
(45) Date of Patent: Feb. 6, 2018

(54) IMAGE READING APPARATUS AND IMAGE FORMING APPARATUS

(71) Applicant: KYOCERA Document Solutions Inc., Osaka-shi, Osaka (JP)

(72) Inventor: Hayato Hirayama, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/250,694

(22) Filed: Aug. 29, 2016

(65) Prior Publication Data

US 2017/0064139 A1 Mar. 2, 2017

(30) Foreign Application Priority Data

Aug. 31, 2015 (JP) ................. 2015-170193

(51) Int. Cl.
*H04N 1/04* (2006.01)
*H04N 1/401* (2006.01)
*H04N 1/031* (2006.01)

(52) U.S. Cl.
CPC ............. *H04N 1/401* (2013.01); *H04N 1/031* (2013.01); *H04N 2201/0094* (2013.01)

(58) Field of Classification Search
CPC . H04N 1/401; H04N 1/031; H04N 2201/0094
USPC ................. 358/474, 446, 498, 497
See application file for complete search history.

(56) References Cited

U.S. PATENT DOCUMENTS

2005/0057783 A1* 3/2005 Kasuga ............... H04N 1/0464
358/446
2013/0201373 A1* 8/2013 Izumi .................. H04N 5/3572
348/300

FOREIGN PATENT DOCUMENTS

JP 2005072784 A 3/2005

* cited by examiner

*Primary Examiner* — Houshang Safaipour
(74) *Attorney, Agent, or Firm* — Alleman Hall Creasman & Tuttle LLP (57) ABSTRACT

An image reading apparatus includes a reference signal output portion, an image sensor, and an analog front end. The reference signal output portion is capable of outputting a first reference signal and a second reference signal, and changing difference in level between the first reference signal and the second reference signal according to a reference level control signal that is inputted. The image sensor outputs a primary image signal that is an analog signal in which a reference level is a level of the first reference signal that is inputted. The analog front end subjects the primary image signal to offset adjustment according to levels of the second reference signal and an offset control signal that are inputted, and further amplifies a signal having been subjected to the offset adjustment, to output a secondary image signal.

5 Claims, 4 Drawing Sheets

FIG. 4

IMAGE READING APPARATUS AND IMAGE FORMING APPARATUS

INCORPORATION BY REFERENCE

This application is based upon and claims the benefit of priority from the corresponding Japanese Patent Application No. 2015-170193 filed on Aug. 31, 2015, the entire contents of which are incorporated herein by reference.

BACKGROUND

The present disclosure relates to image reading apparatuses and image forming apparatuses that include the image reading apparatuses.

In general, an image reading apparatus includes an image sensor such as a CIS (Contact Image Sensor), and an AFE (Analog Front End).

The image sensor senses a light amount of reflected light, for each line in the main scanning direction, from a document that is moved relative to the image sensor, and sequentially outputs an analog image signal corresponding to the one line in the main scanning direction. The AFE is a circuit in which the signal outputted by the image sensor is subjected to a predetermined signal process. The AFE includes an offset adjustment portion and an amplifier portion.

The offset adjustment portion subjects the analog image signal to offset adjustment. The amplifier portion amplifies the signal having been subjected to the offset adjustment. By the offset adjustment, even if a reference level of an image signal outputted by the image sensor fluctuates, a signal obtained by removing, from the image signal, an offset component that includes an amount of fluctuation of the reference level, is amplified by the amplifier portion.

SUMMARY

An image reading apparatus according to one aspect of the present disclosure includes a reference signal output portion, an image sensor, and an analog front end. The reference signal output portion is capable of outputting a first reference signal and a second reference signal, and changing difference in level between the first reference signal and the second reference signal according to a reference level control signal that is inputted. The image sensor is a sensor that outputs a primary image signal that is an analog signal in which a reference level is a level of the first reference signal that is inputted. The analog front end is configured to subject the primary image signal to offset adjustment according to levels of the second reference signal and an offset control signal that are inputted, and further amplify a signal having been subjected to the offset adjustment, to output a secondary image signal.

An image forming apparatus according to another aspect of the present disclosure includes the image reading apparatus according to the one aspect of the present disclosure.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings. The following embodiment is an example embodying the present disclosure and does not have nature of limiting the technical scope of the present disclosure.

[Entire Structure of Apparatus]

Firstly, the entire structure of an image forming apparatus 10 that includes an image reading apparatus 1 according to the embodiment will be described with reference to FIG. 1.

The image forming apparatus 10 includes a main body portion 2 and the image reading apparatus 1. The image forming apparatus 10 also includes an operation display portion 80 and a data processing portion 8 that performs control for the image reading apparatus 1 and units in the main body portion 2, and performs other data processes.

The image forming apparatus 10 is, for example, a copying machine, a printer or a facsimile having a function of a copying machine, or a multifunction peripheral that has a plurality of image processing functions including an image reading function.

<Image Reading Apparatus 1>

Figure 1:
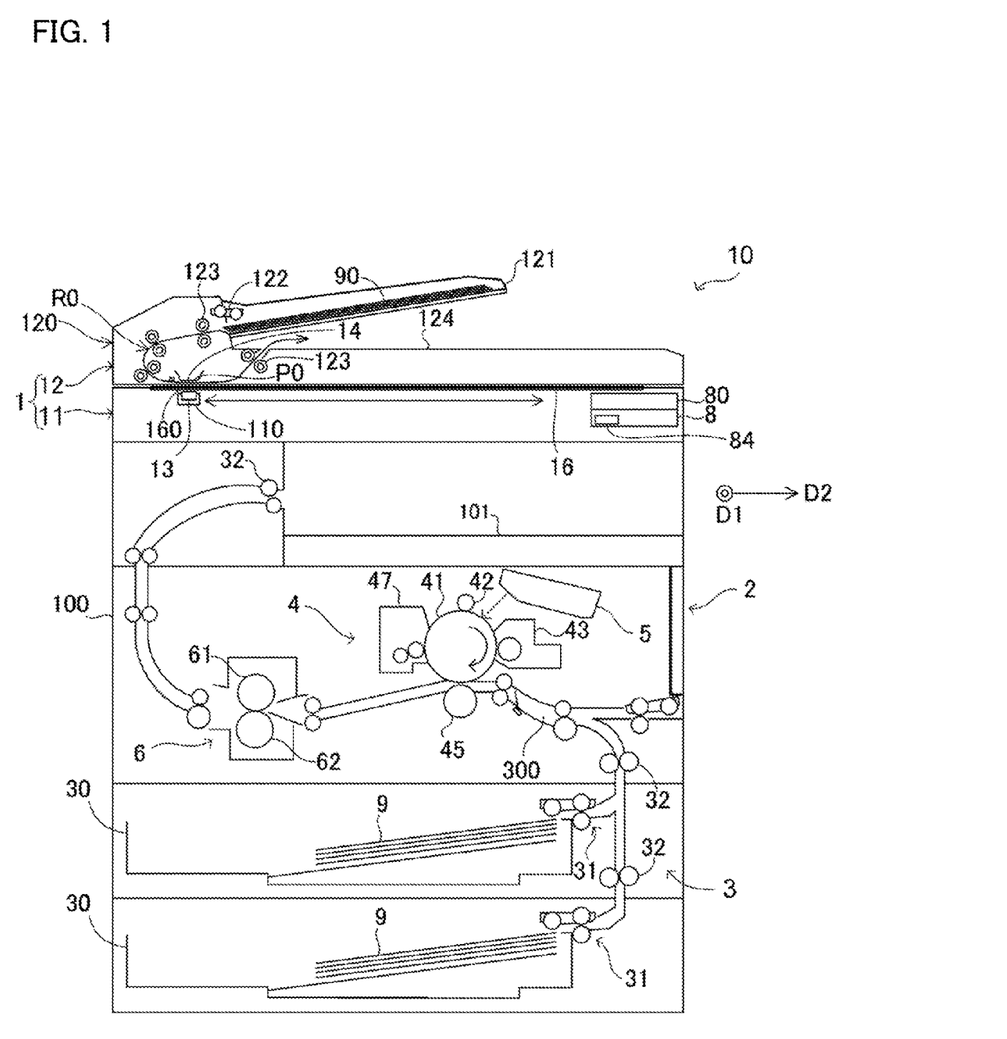
FIG. 1 illustrates a structure of an image forming apparatus that includes an image reading apparatus according to an embodiment.

As shown in FIG. 1, the image reading apparatus 1 includes a document scanning unit 11 and a document table cover 12. The document table cover 12 is supported so as to be pivotable relative to the document scanning unit 11. The document scanning unit 11 includes a transparent document table 16, and the document table cover 12 covers the document table 16.

The document table 16 is a portion on which a document 90 as an object having an image to be read, is placed. In general, the document table 16 is referred to as a platen glass.

The document scanning unit 11 further includes a CIS 13, a scanning mechanism 110, and the like. The CIS 13 is an exemplary image sensor. In the following description, one direction along the document 90 and a direction orthogonal to the one direction are referred to as a main scanning direction D1 and a sub-scanning direction D2, respectively.

The CIS 13 reads an image corresponding to one line along the main scanning direction D1 in the document 90, and outputs an analog image signal corresponding to the read image. The scanning mechanism 110 is a mechanism that reciprocates the CIS 13 at a position near the document table 16 along the sub-scanning direction D2.

The CIS 13 is moved along the sub-scanning direction D2, and thus reads an image on the lower surface of the document 90 placed on the document table 16, and outputs image data of the read image.

In the document table cover 12, an ADF 120 is incorporated. The ADF 120 includes a document supply tray 121, a document feed mechanism 122, a document conveying mechanism 123, and a document discharge tray 124.

The document feed mechanism 122 feeds the documents 90 set in the document supply tray 121, one by one, into a document conveying path R0. The document conveying mechanism 123 conveys the document 90 fed by the document feed mechanism 122 along the document conveying path R0, and further discharges the document 90 onto the document discharge tray 124.

The document conveying path R0 is formed along a predetermined path that passes through a fixed reading position P0 along a transparent contact portion 160. For example, the contact portion 160 is a part of the document table 16.

The sub-scanning direction D2 and the main scanning direction D1 for the document 90 which is being moved in the document conveying path R0 are a moving direction in which the document 90 is moved and a direction orthogonal to the moving direction, respectively.

The scanning mechanism 110 can hold the CIS 13 at a position opposing the fixed reading position P0. The ADF 120 operates in a state where the document table cover 12 is closed and the CIS 13 opposes the fixed reading position P0.

The CIS 13 reads, at the fixed reading position P0, an image of the document 90 that is being moved, and outputs an analog image signal corresponding to the read image.

The image reading apparatus 1 may include another CIS 13 that is fixed at a position along the document conveying path R0. In this case, the CIS 13 supported by the scanning mechanism 110, and the other CIS 13 read an image on one surface of the document 90 and an image on the surface, of the document 90, opposite to the one surface, respectively.

The operation display portion 80 is an operation input portion that includes, for example, a touch panel, an operation button, and the like, and is also a display portion that includes a liquid crystal display panel, a notification lamp, and the like.

The data processing portion 8 controls the image reading apparatus 1 and various electric devices included in the main body portion 2 of the image forming apparatus 10, on the basis of input data inputted through the operation display portion 80, and a detection result from various sensors.

Further, the data processing portion 8 also executes various signal processes for the analog image signal outputted by the CIS 13. For example, the data processing portion 8 includes, for example, an AFE 84 that subjects, to a predetermined signal process, the analog image signal outputted by the CIS 13.

The AFE 84 subjects the analog image signal to offset adjustment, and further amplifies the signal having been subjected to the offset adjustment. The process of the offset adjustment may be referred to as, for example, a level shift process.

By the offset adjustment, even if a reference level of the analog image signal outputted by the CIS 13 fluctuates, a signal obtained by removing, from the image signal, an offset component that includes an amount of fluctuation of the reference level, is amplified.

<Main Body Portion 2 of Image Forming Apparatus 10>

The main body portion 2 of the image forming apparatus 10 includes a device that forms, on a sheet member 9, an image based on image data outputted by the image reading apparatus 1. The sheet member 9 is a sheet-like medium, such as paper, coated paper, a postcard, an envelope, and an OHP sheet, on which an image is formed.

The main body portion 2 of the image forming apparatus 10 includes a sheet supply portion 30, a sheet conveying portion 3, an image forming portion 4, a laser scanning portion 5, a fixing portion 6, and the like. The image forming apparatus 10 shown in FIG. 1 is an electrophotographic type image forming apparatus. The image forming apparatus 10 may be an image forming apparatus of another type such as an inkjet type.

The sheet supply portion 30 is a portion on which a plurality of sheet members 9 are stacked and placed. The sheet conveying portion 3 includes a sheet feed mechanism 31 and a sheet conveying mechanism 32.

The sheet feed mechanism 31 feeds the sheet member 9 from the sheet supply portion 30 toward a sheet conveying path 300. The sheet conveying mechanism 32 conveys the sheet member 9 along the sheet conveying path 300. Thus, the sheet member 9 passes through the image forming portion 4 and the fixing portion 6, and is then discharged through a discharge outlet of the sheet conveying path 300 onto a sheet discharge tray 101.

The image forming portion 4 includes a drum-type photosensitive member 41, a charging device 42, a developing device 43, a transfer device 45, a cleaning device 47, and the like. The photosensitive member 41 is an exemplary image carrier that carries an image of developer.

The photosensitive member 41 rotates, and the charging device 42 uniformly charges the surface of the photosensitive member 41. Further, the laser scanning portion 5 performs scanning with laser light, and thus writes an electrostatic latent image on the surface of the photosensitive member 41 having been charged. Further, the developing device 43 supplies the developer onto the photosensitive member 41, to develop the electrostatic latent image into an image of the developer.

Further, the transfer device 45 transfers the image of the developer on the surface of the photosensitive member 41, onto the sheet member 9 that is being moved between the photosensitive member 41 and the transfer device 45. Further, the cleaning device 47 removes the developer that remains on the surface of the photosensitive member 41.

While nipping the sheet member 9 having an image formed thereon, between a heating roller 61 having a heater thereinside, and a pressure roller 62, the fixing portion 6 feeds the sheet member 9 into the subsequent step. Thus, the fixing portion 6 heats the developer on the sheet member 9, and fixes the image onto the sheet member 9.

[CIS]

Figure 2:
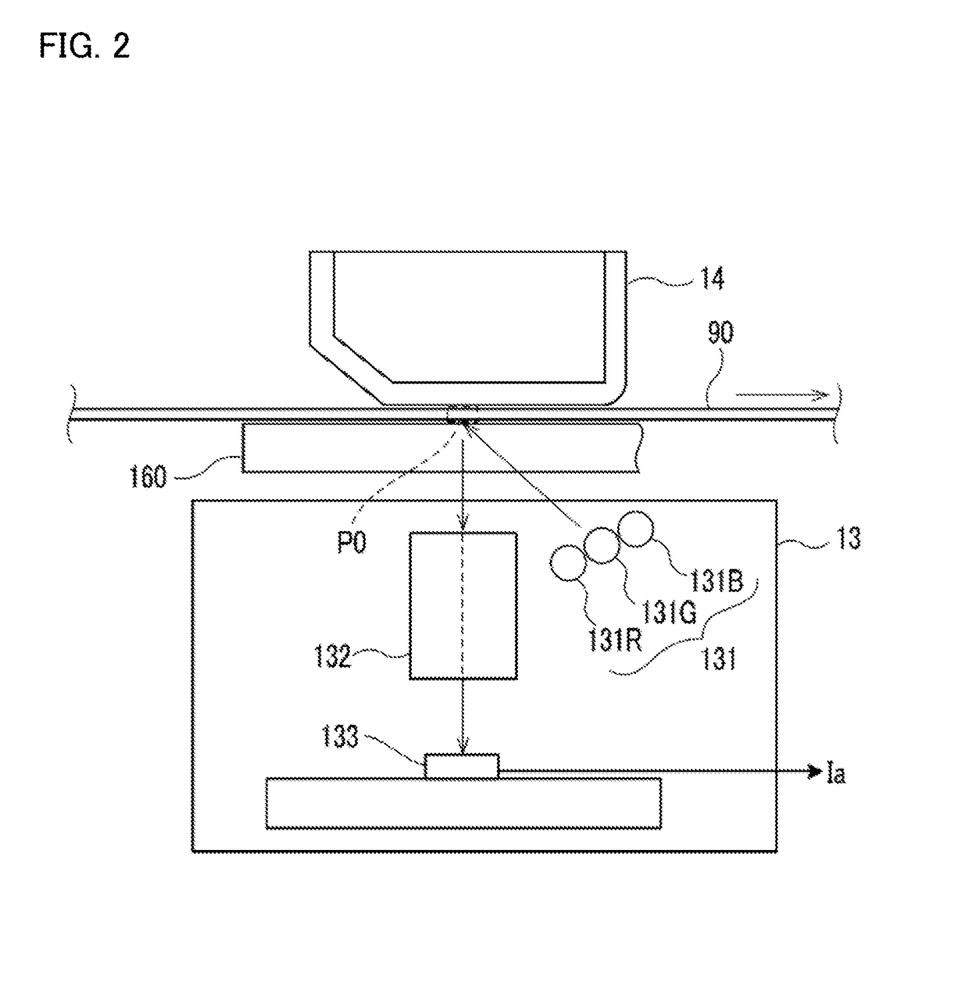
FIG. 2 illustrates a structure of an image sensor module and a region therearound in the image reading apparatus according to the embodiment.

As shown in FIG. 2, the CIS 13 includes a plurality of light emitting portions 131, a lens 132, and a line sensor 133. The plurality of light emitting portions 131, the lens 132, and the line sensor 133 are formed so as to extend along the main scanning direction D1.

The light emitting portions 131 include a red light emitting portion 131R, a green light emitting portion 131G, and a blue light emitting portion 131B. The red light emitting portion 131R, the green light emitting portion 131G, and the blue light emitting portion 131B are capable of individually emitting light. Each of the light emitting portions 131 applies light to a band-shaped region of the document 90 along the main scanning direction D1.

In a case where an image reading mode is a color mode, the red light emitting portion 131R, the green light emitting portion 131G, and the blue light emitting portion 131B sequentially apply red light, green light, and blue light, respectively, to the document 90. Thus, the line sensor 133 sequentially outputs the analog image signal for three colors representing a read image, a green image, and a blue image, respectively, in the document 90.

Meanwhile, in a case where the image reading mode is a monochrome mode, the red light emitting portion 131R, the green light emitting portion 131G, and the blue light emitting portion 131B are simultaneously lit up, to apply white light to the document 90. In this case, the line sensor 133 sequentially outputs the analog image signal for a monochrome color.

For example, the light emitting portions 131 may be implemented by an LED array that includes a plurality of light emitting diodes that are arrayed along the main scanning direction D1. The lens 132 allows light reflected by the document 90 to converge onto a light receiving portion of the line sensor 133.

The line sensor 133 senses a light amount of light reflected by a portion corresponding to one line, in the main scanning direction D1, of the document 90, and sequentially outputs the analog image signal corresponding to the one line in the main scanning direction D1.

In a state where the CIS 13 opposes the fixed reading position P0, the light emitting portions 131 apply light, through the contact portion 160, to the surface of the document 90 that is being moved. Further, the line sensor 133 sequentially senses a light amount of light reflected by the portion corresponding to the one line, in the main scanning direction D1, of the document 90 that is being moved, and sequentially outputs the analog image signal that represents an image corresponding to the one line.

The contact portion 160 and a color reference portion 14 are disposed on both sides of the fixed reading position P0 in the document conveying path R0, so as to oppose each other. The surface, of the color reference portion 14, opposing the fixed reading position P0 is a surface that is uniformly colored in a reference color having a high light reflectance. In general, the reference color is white. The reference color may be, for example, a light yellowish color.

As described below, the data processing portion 8 includes the AFE 84 that subjects, to a predetermined signal process, the analog image signal outputted by the CIS 13.

Due to a temperature characteristic of the CIS 13, the reference level of the analog image signal outputted by the CIS 13 may fluctuate to exceed an adjustment-allowed range in the offset adjustment by the AFE 84. In this case, output of an image signal may become abnormal, for example, an image signal which is outputted by the AFE 84 after amplification, may have a level that indicates a density lower than a density of an actual image, or may be saturated to an upper limit level.

Further, increase of the adjustment-allowed range in the offset adjustment by the AFE 84, is restricted due to, for example, limitation of a signal resolution of the AFE 84.

Meanwhile, the image reading apparatus 1 can prevent output of an image signal by the AFE 84 from becoming abnormal even if the reference level of the analog image signal outputted by the CIS 13 greatly fluctuates. Hereinafter, the detail thereof will be described.

[Data Processing Portion 8]

Figure 3:
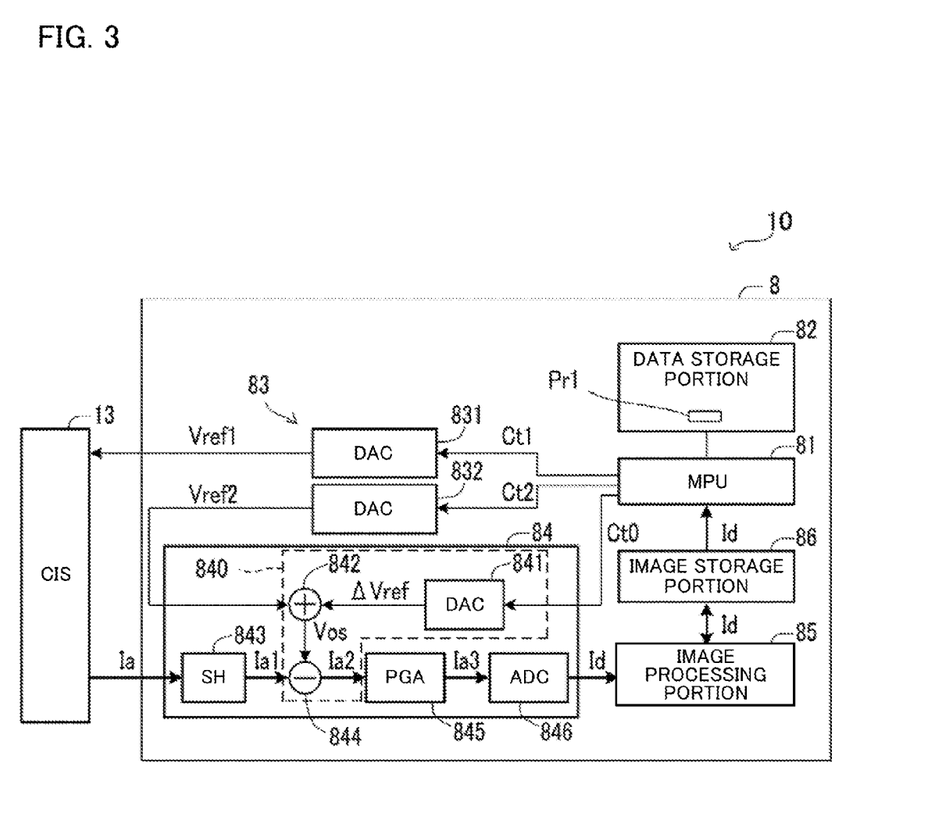
FIG. 3 is a block diagram illustrating a data processing portion of the image reading apparatus according to the embodiment.

As shown in FIG. 3, the data processing portion 8 includes an MPU (Micro Processor Unit) 81, a data storage portion 82, a reference signal output portion 83, the AFE 84, an image processing portion 85, an image storage portion 86, and the like. The AFE 84 and the image processing portion 85 are implemented by, for example, a DSP (Digital Signal Processor) or an ASIC (Application Specific Integrated Circuit).

The MPU 81 is a processor that executes various calculation processes. The data storage portion 82 is a non-volatile information storage medium in which programs for causing the MPU 81 to execute various processes, and other information are previously stored. The data storage portion 82 is also an information storage medium from which the MPU 81 can read various information and in which the MPU 81 can write various information.

The MPU 81 comprehensively controls the image forming apparatus 10 by executing various programs that are previously stored in the data storage portion 82.

In the following description, an analog image signal outputted by the CIS 13 is referred to as a primary image signal Ia. Further, an image signal that is outputted, by the AFE 84 that subjects the primary image signal Ia to signal processing, after the signal processing, is referred to as a secondary image signal Id.

The reference signal output portion 83 outputs a first reference signal Vref1 to the CIS 13, and outputs a second reference signal Vref2 to the AFE 84.

The CIS 13 outputs the primary image signal Ia that is an analog signal in which the reference level is the level of the inputted first reference signal Vref1. The first reference signal Vref1 is a voltage signal. The primary image signal Ia is a voltage signal in which a voltage representing a density of an image is superimposed on a voltage of the first reference signal Vref1.

However, due to, for example, varying of an environmental condition such as a temperature of the CIS 13, even if the level of the first reference signal Vref1 is constant, the reference level may fluctuate.

Meanwhile, the AFE 84 subjects the primary image signal Ia to offset adjustment according to levels of the second reference signal Vref and an offset control signal Ct0 that are inputted. That is, the second reference signal Vref2 is used as a reference signal in the offset adjustment for the primary image signal Ia. The detail thereof will be described below.

The reference signal output portion 83 can change difference in level between the first reference signal Vref1 and the second reference signal Vref2 according to reference level control signals Ct1 and Ct2 that are inputted. In the present embodiment, the reference signal output portion 83 includes a first reference signal output portion 831 and a second reference signal output portion 832.

In the present embodiment, the first reference signal output portion 831 is a digital-analog converter that converts the inputted first reference level control signal Ct1 that is a digital signal, to the first reference signal Vref1 that is an analog voltage signal. Similarly, the second reference signal output portion 832 is a digital-analog converter that converts the inputted second reference level control signal Ct2 that is a digital signal, to the second reference signal Vref2 that is an analog voltage signal.

Therefore, the reference signal output portion 83 can individually change the level of the first reference signal Vref1 and the level of the second reference signal Vref2 according to the inputted first reference level control signal Ct1 and second reference level control signal Ct2, respectively.

The AFE 84 includes an adjustment signal generation portion 841, an adder portion 842, a sample-hold portion 843, a subtraction portion 844, and an amplifier portion 845. Further, in present embodiment, the AFE 84 also includes an analog-digital converter 846.

The adjustment signal generation portion 841 generates an adjustment signal ΔVref indicating a level based on the level of the inputted offset control signal Ct0. In the present embodiment, the adjustment signal generation portion 841 is a digital-analog converter that converts the inputted offset control signal Ct0 that is a digital signal, to the adjustment signal ΔVref that is an analog voltage signal.

The adder portion 842 outputs an offset signal Vos that is a voltage signal indicating a level obtained by addition of the level of the inputted second reference signal Vref2 and the level of the inputted adjustment signal ΔVref.

The sample-hold portion 843 performs sampling of the primary image signal Ia at predetermined intervals, to output a sampling signal Ia1. The level of the sampling signal Ia1 is maintained until a new sampling signal Ia1 is obtained. The sampling cycle is a cycle in which a light amount detection signal of each pixel in the main scanning direction D1 appears in the primary image signal Ia.

The subtraction portion 844 outputs an offset-adjusted signal Ia2 that is a voltage signal indicating a level that is obtained by the level of the offset signal Vos being subtracted from the level of the sampling signal Ia1 obtained by sampling of the primary image signal Ia. The offset-adjusted signal Ia2 is a signal obtained by an offset component being removed from the primary image signal Ia. The offset component of the primary image signal Ia is a component of the reference level of the primary image signal Ia.

The adjustment signal generation portion 841, the adder portion 842, and the subtraction portion 844 in the AFE 84 represent an example of an offset adjustment portion that subjects the primary image signal Ia that is an analog signal, to the offset adjustment.

The amplifier portion 845 is a programmable gain amplifier that amplifies the offset-adjusted signal Ia2. The amplifier portion 845 amplifies the offset-adjusted signal Ia2 according to a gain based on an inputted gain control signal which is not shown, and outputs an amplified signal Ia3. The gain control signal is supplied from the MPU 81.

The analog-digital converter 846 converts the amplified signal Ia3 to the secondary image signal Id that is a digital image signal. The analog-digital converter 846 may be provided outside the AFE 84. In this case, the secondary image signal outputted by the AFE 84 is the amplified signal Ia3 that is an analog signal.

The image processing portion 85 executes a well-known image process, such as a shading correction process, a process of converting data corresponding to a light amount to data corresponding to density, and a gamma correction process, for the secondary image signal Id. Thus, the secondary image signal Id in which the image processing has been performed, is obtained.

The image storage portion 86 stores the secondary image signal Id in which the image processing has been performed. The image storage portion 86 is a so-called frame memory. The MPU 81 can obtain, via the image processing portion 85 and the image storage portion 86, a pixel value of pixels that are included in the secondary image signal Id outputted by the AFE 84.

Further, the image processing portion 85 may calculate a representative value such as a peak value or an average value of pixel values of pixels included in the secondary image signal Id, and store the representative value in the image storage portion 86. Thus, the MPU 81 can obtain, via the image processing portion 85 and the image storage portion 86, a representative value of a plurality of pixel values of pixels that are included in the secondary image signal Id outputted by the AFE 84.

As described above, due to, for example, a temperature characteristic of the CIS 13, the reference level of the primary image signal Ia outputted by the CIS 13 may fluctuate to exceed an adjustment-allowed range in the adjustment by the offset adjustment portion 840 of the AFE 84. Also in such a case, difference in level between the first reference signal Vref1 and the second reference signal Vref2 is changed, whereby the reference level of the primary image signal Ia can be adjusted so as to be a level within the adjustment-allowed range in the adjustment by the offset adjustment portion 840.

For example, a case where the first reference signal Vref1 and the second reference signal Vref2 have the same level, and the reference level (offset component) of the primary image signal Ia is higher than the level of the first reference signal Vref1, is assumed.

In the above case, when difference between the reference level of the primary image signal Ia and the level of the second reference signal Vref2 exceeds an upper limit level in an adjustment-allowed range in the adjustment by the adjustment signal ΔVref, the offset adjustment portion 840 cannot sufficiently remove the offset component of the primary image signal Ia. In this case, output of an image signal may become abnormal, for example, the secondary image signal Id which is outputted by the AFE 84 after amplification, may have a level that indicates a density lower than a density of an actual image, and/or may be saturated to the upper limit level.

However, in the present embodiment, the level of the second reference signal Vref2 is set so as to be higher than the level of the first reference signal Vref1, whereby the reference level of the primary image signal Ia can be within an adjustment-allowed range in adjustment by the offset adjustment portion 840. As a result, even if the reference level of the primary image signal Ia greatly fluctuates, output of an image signal by the AFE 84 can be prevented from becoming abnormal.

The offset control signal Ct0, the first reference level control signal Ct1, and the second reference level control signal Ct2 which are outputted by the MPU 81 are set in a black image signal level adjustment process executed when the light emitting portions 131 of the CIS 13 are turned off.

[The Black Image Signal Level Adjustment Process]

Figure 4:
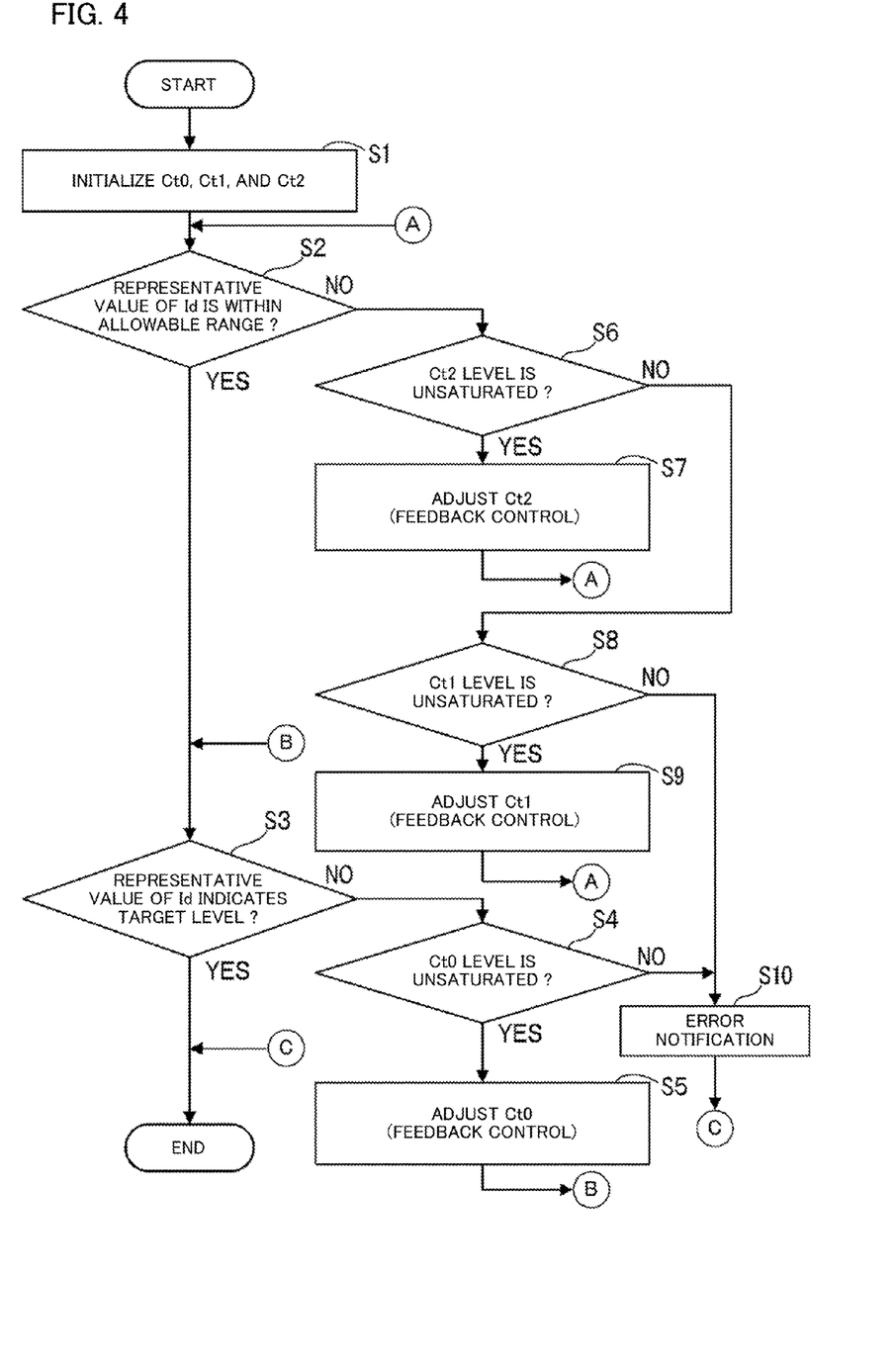
FIG. 4 is a flow chart showing an example of a procedure of a black image signal level adjustment process by the image reading apparatus according to the embodiment.

Hereinafter, an example of a procedure of the black image signal level adjustment process executed by the MPU 81 will be described with reference to a flow chart shown in FIG. 4. In the following description, S1, S2, . . . represent identification numerals of the respective steps executed by the MPU 81.

The MPU 81 executes the black image signal level adjustment process by executing a black image signal level adjustment program Pr1 that is previously stored in the data storage portion 82. The black image signal level adjustment process is performed in a state where the light emitting portions 131 are turned off. In the following description, the primary image signal Ia outputted by the CIS 13 in a state where the light emitting portions 131 are turned off, is referred to as the primary image signal Ia of black. Similarly, the secondary image signal Id outputted by the AFE 84 in a state where the light emitting portions 131 are turned off, is referred to as the secondary image signal Id of black.

<Step S1>

In the black image signal level adjustment process, the MPU 81 firstly sets, to predetermined initial values, levels of the offset control signal Ct0, the first reference level control signal Ct1, and the second reference level control signal Ct2.

In the process step of step S1, the first reference signal Vref1 indicating a level corresponding to the initial value of the level of the first reference level control signal Ct1 is supplied to the CIS 13. Further, the second reference signal Vref2 indicating a level corresponding to the initial value of the level of the second reference level control signal Ct2 is supplied to the adder portion 842 of the AFE 84. Furthermore, the adjustment signal ΔVref indicating a level corresponding to the initial value of the level of the offset control signal Ct0 is supplied to the adder portion 842 of the AFE 84.

For example, the initial values of the levels of the first reference level control signal Ct1 and the second reference level control signal Ct2 may be equal to each other. Thus, difference in level between the first reference signal Vref1 and the second reference signal Vref2 is 0.

Further, the initial value of the level of the first reference level control signal Ct1 may be a median in the adjustment-allowed range. Furthermore, the initial value of the level of the second reference level control signal Ct2 may be also a median in the adjustment-allowed range.

The adjustment-allowed range for the level of the first reference level control signal Ct1 is typically defined according to the specifications, for an input signal, of the CIS 13, that is, the upper limit level and the lower limit level of the first reference signal Vref1 that can be inputted by the CIS 13.

The adjustment-allowed range for the level of the second reference level control signal Ct2 is defined according to, for example, the specifications, for an input signal, of the analog-digital converter 846 or the amplifier portion 845 of the AFE 84, and the adjustment-allowed range for the adjustment signal ΔVref.

Further, the initial value of the level of the offset control signal Ct0 may be the upper limit level in the adjustment-allowed range.

As described below, the offset control signal Ct0, the first reference level control signal Ct1, and the second reference level control signal Ct2 are adjusted such that a maximum value (peak value) of pixel values of pixels in the secondary image signal Id obtained when the light emitting portions 131 are turned off, approaches a target value or a target range. When the upper limit level in the adjustment-allowed range for the offset control signal Ct0 is set as the initial value, the amplified signal Ia3 is likely to be prevented from being lower than an input lower limit level of the analog-digital converter 846.

<Step S2>

Next, the MPU 81 determines whether or not a representative value of a plurality of pixels values of pixels in the secondary image signal Id of black obtained at the time, is within a predetermined allowable range. The allowable range corresponds to the adjustment-allowed range in adjustment by the offset adjustment portion 840.

The representative value of the plurality of pixel values of pixels in the secondary image signal Id of black may be the maximum value (peak value). There may be a case where the representative value of the plurality of pixel values of pixels in the secondary image signal Id of black is, for example, an average value.

The secondary image signal Id of black which is referred to in step S2, is the secondary image signal Id of black which is obtained when the levels of the offset control signal Ct0, the first reference level control signal Ct1, and the second reference level control signal Ct2 are set so as to be most recent ones.

<Step S3>

In a case where the representative value for the secondary image signal Id of black is within the allowable range, the MPU 81 determines whether or not the representative value indicates a predetermined target level. The target level is a level within the allowable range, and is the level in a range narrower than the allowable range.

<Step S4>

When the representative value does not indicate the target level, the MPU 81 determines whether or not the level of the offset control signal Ct0 is saturated to the upper limit level or the lower limit level in the adjustment-allowed range.

<Step S5>

In a case where the level of the offset control signal Ct0 is not saturated, the MPU 81 adjusts the level of the offset control signal Ct0 by a first feedback control, and outputs, to the AFE 84, the offset control signal Ct0 that has been adjusted.

The first feedback control is a loop control in which the level of the offset control signal Ct0 is changed such that the level of the secondary image signal Id approaches the target level. In the present embodiment, the level of the secondary image signal Id is the representative value that is representative of a plurality of pixel values of pixels in the secondary image signal Id.

In the first feedback control, the level of the offset control signal Ct0 is adjusted according to deviation between the level of the secondary image signal Id and the target level, resulting in the level of the adjustment signal ΔVref being adjusted.

The MPU 81 executes the process step of step S5 when the representative value for the secondary image signal Id is within the allowable range. The MPU 81 repeats the process steps of steps S3 to S5 until the representative value for the secondary image signal Id of black reaches the target level.

That is, when the level of the secondary image signal Id is within the allowable range, the MPU 81 adjusts, in step S5, the level of the offset control signal Ct0 in the first feedback control in which the level of the secondary image signal Id is caused to approach a predetermined target level, and outputs, to the AFE 84, the offset control signal Ct0 that has been adjusted. The MPU 81 that executes the process step of step S5 is an example of an offset control portion.

<Step S6>

Meanwhile, when the representative value of the secondary image signal Id of black is not within the allowable range, the MPU 81 determines whether or not the level of the second reference level control signal Ct2 is saturated to the upper limit level or the lower limit level in the adjustment-allowed range.

<Step S7>

When the level of the second reference level control signal Ct2 is not saturated, the MPU 81 adjusts the level of the second reference level control signal Ct2 by a second feedback control, and outputs, to the AFE 84, the second reference level control signal Ct2 that has been adjusted.

The second feedback control is a loop control in which the level of a signal to be controlled is changed such that the level of the secondary image signal Id approaches a level within the allowable range. The signal to be controlled in step S7 is the second reference level control signal Ct2. As described above, the level of the secondary image signal Id indicates the representative value that is representative of a plurality of pixel values of pixels in the secondary image signal Id.

In the second feedback control in step S7, the level of the second reference level control signal Ct2 is adjusted according to deviation between the level of the secondary image signal Id and the level in the allowable range, resulting in the level of the second reference signal Vref2 being adjusted. Thus, difference in level between the first reference signal Vref1 and the second reference signal Vref2 is changed.

The MPU 81 repeats the process steps of steps S2, S6, and S7 until the representative value for the secondary image signal Id of black reaches a level within the target range. When the representative value has reached the level in the target range, the MPU 81 executes the process steps from step S3 described above.

<Step S8>

In a case where the level of the second reference level control signal Ct2 is saturated before the representative value for the secondary image signal Id of black converges to a level within the target range, the MPU 81 determines whether or not the level of the first reference level control signal Ct1 is saturated to the upper limit level or the lower limit level within the adjustment-allowed range.

<Step S9>

In a case where the level of the first reference level control signal Ct1 is not saturated, the MPU 81 adjusts the level of the first reference level control signal Ct1 by the second feedback control, and outputs, to the CIS 13, the first reference level control signal Ct1 that has been adjusted. The signal to be controlled in the second feedback control in step S9 is the first reference level control signal Ct1.

The level of the first reference level control signal Ct1 is adjusted according to deviation between the level of the secondary image signal Id and the level within the allowable range, in the second feedback control in step S9, resulting in the level of the first reference signal Vref1 being adjusted. Thus, difference in level between the first reference signal Vref1 and the second reference signal Vref2 is changed.

The MPU 81 repeats the process steps of steps S2, S8, and S9 until the representative value for the secondary image signal Id of black reaches a level within the target range. When the representative value has reached the level within the target range, the MPU 81 executes the process steps from step S3 described above.

As described above, in a case where the level of the secondary image signal Id is outside a predetermined allowable range, the MPU 81 in steps S6 to S9 adjusts the levels of the reference level control signals Ct1 and Ct2 in the second feedback control in which the level of the secondary image signal Id approaches a level within the allowable range, and outputs, to the reference signal output portion 83, the reference level control signals Ct1 and Ct2 that have been adjusted. The MPU 81 that executes the process steps of steps S6 to S9 is an example of a reference level control portion.

Further, in the present embodiment, in a case where the representative value for the secondary image signal Id is outside the allowable range, the MPU 81 performs preceding adjustment of the level of the second reference level control signal Ct2 in the second feedback control, and outputs, to the second reference signal output portion 832, the second reference level control signal Ct2 that has been adjusted (S2, S6, S7). The MPU 81 that executes the process steps of steps S2, S6, and S7 is an example of a preceding control portion.

Further, in a case where the level of the secondary image signal Id cannot converge to a level within the allowable range in the process steps of steps S2, S6, and S7, the MPU 81 adjusts the level of the first reference level control signal Ct1 in the second feedback control, and outputs, to the first reference signal output portion 831, the first reference level control signal Ct1 that has been adjusted (S2, S8, S9). The MPU 81 that executes the process steps of steps S2, S8, and S9 is an example of a following control portion.

<Step S10>

In a case where both the first reference level control signal Ct1 and the second reference level control signal Ct2 are saturated before the representative value for the secondary image signal Id of black reaches a level within the target range, the MPU 81 executes a predetermined error notification through the operation display portion 80.

Also in a case where the level of the offset control signal Ct0 is saturated before the representative value for the secondary image signal Id of black reaches the target level, the MPU 81 executes a predetermined error notification through the operation display portion 80.

The reference level control signals Ct1 and Ct2 are adjusted in the black image signal level adjustment process only when the reference level of the primary image signal Ia relatively greatly fluctuates due to, for example, change of an environmental temperature. In this case, the level of each control signal can be adjusted in a simple feedback control.

Further, the respective levels of the first reference signal Vref1 and the second reference signal Vref2 can be independently changed, whereby greater fluctuation of the reference level of the primary image signal Ia can be also addressed.

In a case where the level of the inputted first reference signal Vref1 is changed, the change may slightly affect a signal component representing density of an image of the primary image signal Ia in an image sensor such as the CIS 13. Further, change of the reference level of the outputted primary image signal Ia may not be proportional to change of the level of the inputted first reference signal Vref1. In these cases, it is desired that the number of times of the second feedback control in which the first reference level control signal Ct1 is a signal to be controlled, is reduced as much as possible.

Therefore, in adjustment of the reference level control signals Ct1 and Ct2, the preceding adjustment is performed for the second reference level control signal Ct2, whereby the number of times of the second feedback control in which the first reference level control signal Ct1 is a signal to be controlled, can be minimized.

[Application Example]

A case where, in the above-described embodiment, the adjustment-allowed range is different between the first reference level control signal Ct1 and the second reference level control signal Ct2, may be considered. One, of the first reference level control signal Ct1 and the second reference level control signal Ct2, having a greater adjustment-allowed range for the level, is referred to as a reference level control signal having a great adjustment range, and the other thereof having a smaller adjustment-allowed range, is referred to as a reference level control signal having a smaller adjustment range.

In the above case, the process steps (process steps by the preceding control portion) of steps S2, S6, and S7 which are executed when the level of the secondary image signal Id is outside the allowable range, may be a process of adjusting, in the second feedback control, the level of the reference level control signal having the greater adjustment range.

Further, the process steps (process steps by the following control portion) of steps S2, S8, and S9 which are executed when the level of the secondary image signal Id cannot converge to a level within the allowable range in the process steps of steps S2, S6, and S7, may be a process of adjusting, in the second feedback control, the level of the reference level control signal having the smaller adjustment range. Thus, the level of the secondary image signal Id is more likely to converge to the target level in up to the two-stage controls of the control of the offset control signal Ct0 and the control of the reference level control signal having the greater adjustment range, whereby the level adjustment of the control signal can be quickly performed.

In the above embodiment, one of the levels of the first reference signal Vref1 and the second reference signal Vref2 may be constant, and the other of the levels thereof may be variable according to the reference level control signal Ct1 or Ct2. Also in this case, difference in level between the first reference signal Vref1 and the second reference signal Vref2 can be changed according to the reference level control signal Ct1 or Ct2 that is inputted.

The image reading apparatus and the image forming apparatus according to the present disclosure can be configured by freely combining the embodiments and application examples described above, or modifying or partially omitting the embodiments and the application examples as appropriate, within the scope of the disclosure recited in each claim.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus comprising:
   a reference signal output portion capable of outputting a first reference signal and a second reference signal, and changing difference in level between the first reference signal and the second reference signal according to a reference level control signal that is inputted;
   an image sensor configured to output a primary image signal that is an analog signal in which a reference level is a level of the first reference signal that is inputted;
   an analog front end configured to subject the primary image signal to offset adjustment according to levels of the second reference signal and an offset control signal that are inputted, and further amplify a signal having been subjected to the offset adjustment, to output a secondary image signal;
   an offset control portion configured to: adjust a level of the offset control signal in a first feedback control in which a level of the secondary image signal approaches a predetermined target level, when the level of the secondary image signal is within a predetermined allowable range; and output, to the analog front end, the offset control signal that has been adjusted; and
   a reference level control portion configured to: adjust a level of the reference level control signal in a second feedback control in which a level of the secondary image signal approaches a level within the allowable range, when the level of the secondary image signal is outside the allowable range; and output, to the reference signal output portion, the reference level control signal that has been adjusted.

2. The image reading apparatus according to claim 1, wherein the reference signal output portion is capable of independently changing a level of the first reference signal and a level of the second reference signal according to a first reference level control signal and a second reference level control signal, respectively, which are inputted.

3. The image reading apparatus according to claim 2, wherein
   the reference level control portion includes:
   a preceding control portion configured to adjust a level of the second reference level control signal in the second feedback control when the level of the secondary image signal is outside the allowable range; and
   a following control portion configured to adjust a level of the first reference level control signal in the second feedback control when the level of the secondary image signal cannot converge to a level within the allowable range by the preceding control portion.

4. The image reading apparatus according to claim 2, wherein
   the reference level control portion includes:
   a preceding control portion configured to adjust, in the second feedback control, a level of one, of the first reference level control signal and the second reference level control signal, having a greater adjustment-allowed range for a level in a case where a level of the secondary image signal is outside the allowable range; and
   a following control portion configured to adjust, in the second feedback control, a level of one, of the first reference level control signal and the second reference level control signal, having a smaller adjustment-allowed range for a level in a case where the level of the secondary image signal cannot converge to a level in the allowable range by the preceding control portion.

5. An image forming apparatus comprising the image reading apparatus according to claim 1.

* * * * *